Sept. 6, 1966     O. J. BRIDENSTINE ETAL     3,270,913
NESTABLE AND STACKABLE CONTAINER
Filed Oct. 5, 1964     5 Sheets-Sheet 1

FIG. 1

INVENTORS
O. J. BRIDENSTINE
W. A. KEENE
BY *Young and Quigg*

ATTORNEYS

Sept. 6, 1966  O. J. BRIDENSTINE ETAL  3,270,913
NESTABLE AND STACKABLE CONTAINER Filed Oct. 5, 1964  5 Sheets-Sheet 2

FIG. 2

INVENTORS
O.J. BRIDENSTINE
W.A. KEENE
BY
Young and Quigg
ATTORNEYS

INVENTORS
O. J. BRIDENSTINE
W. A. KEENE
BY

ATTORNEYS

United States Patent Office 3,270,913
Patented Sept. 6, 1966

3,270,913
NESTABLE AND STACKABLE CONTAINER
Orville J. Bridenstine, Caney, Kans., and William A. Keene, Bartlesville, Okla., assignors to Phillips Petroleum Company, a corporation of Delaware
Filed Oct. 5, 1964, Ser. No. 401,390
12 Claims. (Cl. 220—97)

The invention relates to a nestable and stackable container.

Nestable and stackable containers are well known in the art. In general, such containers comprise an open top, commonly rectangular, container so constructed that in one position an upper container will nest within an identical lower container for storage purposes, and when said upper container is rotated to another position it will stack vertically on said lower container. Most commonly, the containers of the prior art will stack only upon being rotated through 180°. However, nesting and stacking containers are known which will stack upon being rotated through either 90° or 180°. Nestable and stackable containers are being employed in increasing numbers in a wide variety of applications such as lug boxes in the fruit and vegetable industry, as storage bins for parts, and other uses. In practically all of said uses it is desirable that the container be provided with maximum vertical support in the wall portions thereof so that when a number of filled containers are stacked vertically the lowermost containers in the stack will not be collapsed or become warped. It is also desirable that said containers be provided with convenient handle means for manual handling. Even though mechanical handling of such containers, and particularly the palletizing of groups of such containers, is being more and more widely employed, there are still steps in said mechanical handling operations where the containers must be handled manually. In many instances, it is further desirable that the containers be provided with flat walls, if possible, to facilitate mechanical handling such as on conveyor belts, etc. It is also highly desirable that said containers can be economically fabricated from moldable materials such as plastics and metals.

Attaining all of the above advantages or features in one container has been extremely difficult. The side and end walls of the containers have been provided with corrugations or convolutions so as to provide increased vertical strength thereto. However, this has created problems in the handling of said containers due to interlocking of said corrugations when the ends of containers encountered one another in use, as on conveyor belts or when placed side by side. Such containers in the past have been commonly provided with handles by providing an opening in opposed walls. Such handle openings weaken said walls. Furthermore, such openings provide places where the contents of the container can be damaged, such as soft fruits and vegetables being damaged by the fingers of the person handling the container.

The present invention solves the above problem by providing a nestable and stackable container which is not subject to the above difficulties or limitations. The improved containers of the invention are provided with improved wall structures having improved handle means disposed therein which materially increase the structural strength of the container, and increase both the mechanical and manual handling convenience without sacrificing economy of fabrication.

An object of this invention is to provide an improved nestable and stackable container. Another object of this invention is to provide a nestable and stackable container which is extremely sturdy and which is capable of affording usually strong vertical support to a plurality of like containers stacked thereon. Another object of this invention is to provide improved wall structures for nesting and stacking containers. Another object of this invention is to provide a nesting and stacking container having an improved manual handle structure which strengthens the wall in which it is positioned rather than weakening said wall. Another object of this invention is to provide a nesting and stacking container provided with improved wall structures. Another object of this invention is to provide an improved nesting and stacking container which will stack upon being rotated through 90°. Another object of this invention is to provide an improved nesting and stacking container which will stack upon being rotated through either 90° or through 180°. Another object of this invention is to provide a nesting and stacking container having the characteristics recited in preceding objects and which can be readily and economically fabricated from any moldable, formable, or shapable material such as the various plastics and metals. Other aspects, objects, and advantages of the invention will be apparent to those skilled in the art in view of this disclosure.

Figure 1:
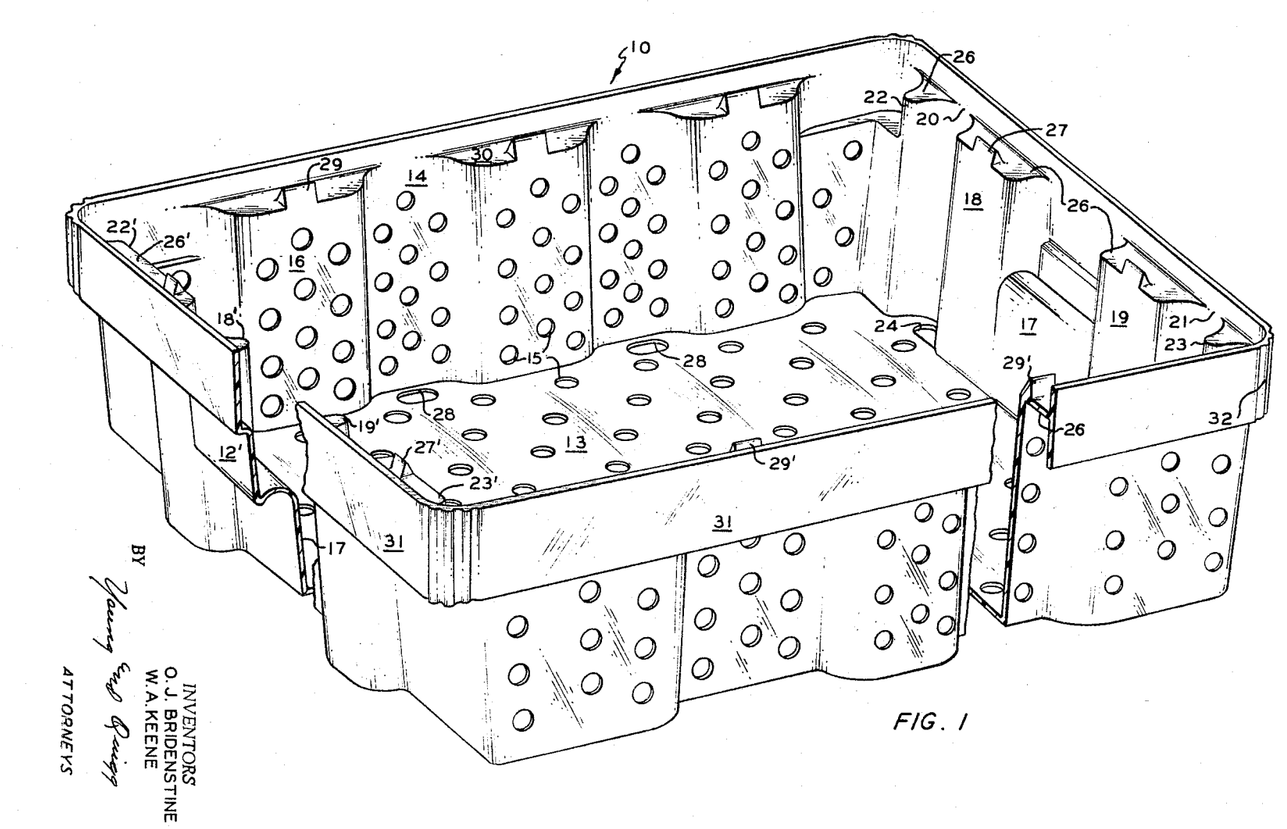
FIGURE 1 is a perspective view, partly in cross-section, of a container fabricated in accordance with the invention.
Figure 2:
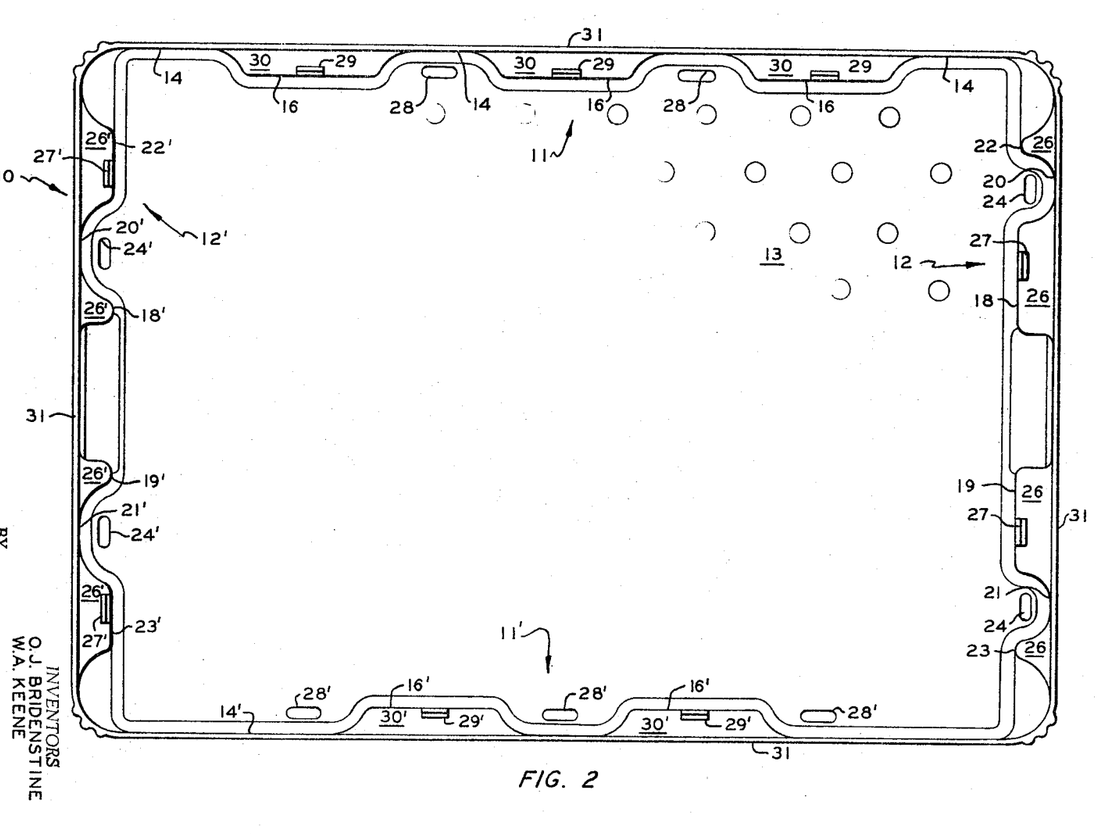
FIGURE 2 is a top or plan view of the container of FIGURE 1 except that the perforations in the bottom wall thereof have been omitted.
Figure 3:
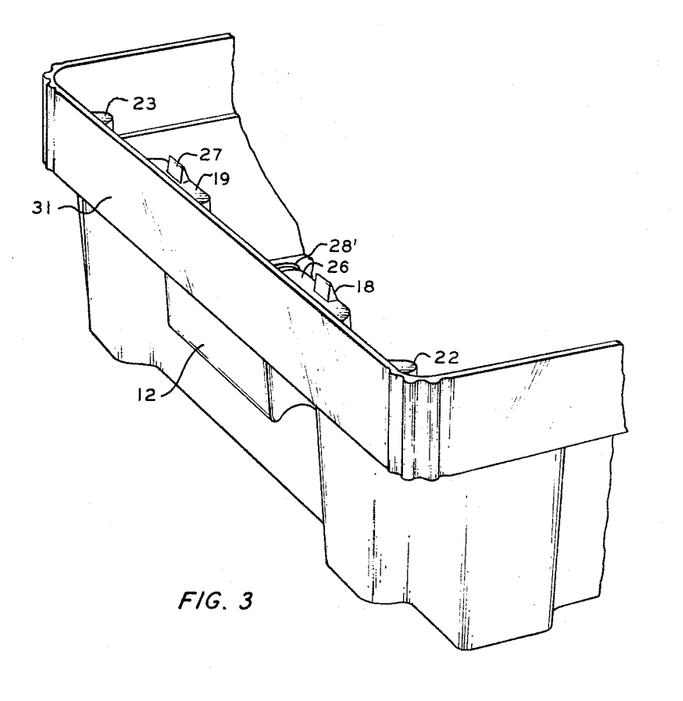
FIGURE 3 is a perspective view of the other hand of the container of FIGURE 1.

Referring now to the drawings, wherein like reference numerals are employed to denote like elements, the invention will be more fully explained. Said drawings, illustrate stackable and nestable containers of the invention which can be formed of any suitable plastic, metal, or other moldable or otherwise formable material. As shown in said FIGURES 1 to 4, a container, denoted generally by the reference numeral 10, comprises a pair of opposed side walls designated generally 11 and 11' (see FIGURE 2) which slope inwardly toward each other from top to bottom, and a pair of opposed transverse end walls, designated generally 12 and 12' in FIGURE 2, which also slope inwardly toward each other from top to bottom. The degree of slope of said walls is at least equal to the thickness of the walls, and preferably a little greater than said thickness, to facilitate nesting of the containers. Said side walls are connected to said end walls along the vertical edges thereof. A bottom wall 13 connects the lower edges of said side walls and said end walls to provide a generally rectangular open top structure. If desired, said bottom wall 13 can be coved or curved upwardly as shown in FIGURE 1. By thus coving or curving said bottom wall upwardly, additional strength is imparted thereto when the container is loaded and prevents said bottom wall from sagging under said load, thus protecting the contents of a lower stacked container from possible damage. Also, said coved bottom wall when moved downwardly to a substantially flat or horizontal position under the weight of the load in the container will strengthen the walls of the container by imparting an inwardly directed force thereto and tend to prevent any spreading of the side and end walls which might otherwise occur. If desired, the bottom and walls of the container can be provided with a plurality of perforations 15 for ventilation purposes or as an aid in cleaning and draining.

Each of the side walls 11 and 11' is comprised of a plurality of substantially vertical alternate outwardly extending side wall flutes 14 and 14', respectively, and inwardly extending side wall flutes 16 and 16', respectively. Said outwardly and inwardly extending flutes are so arranged that an inwardly extending flute in one side wall is opposite an outwardly extending flute in the other side wall. As used herein and in the claims, unless otherwise specified, the terms "outwardly extending" and "inwardly extending" are employed relatively. Thus, referring to the upper left-hand corner of FIGURE 2, "inwardly extending" flutes 16 extend inwardly relative to "outwardly extending" flutes 14.

An inwardly and horizontally extending handle protuberance 17 is disposed, preferably centrally, in each of said end walls 12 and 12' and opposite each other. Each said handle protuberance terminates in an outwardly extending surface (preferably arcuate) which is integrally connected at its outer extremity to the end wall in which said handle protuberance is disposed. Said handle protuberance terminates at a point intermediate the top and bottom of said end wall, preferably about the middle of said wall. A first pair of horizontally spaced apart substantially vertical and inwardly extending end wall flutes 18 and 19 and 18' and 19' are disposed in each of said end walls 12 and 12', respectively, with one flute at each opposite end of the handle protuberance 17. For example, flutes 18 and 19 are at opposite ends of the handle protuberance 17 in end wall 12 and flutes 18' and 19' are at opposite ends of the handle protuberance disposed in end wall 12'. As shown in the drawings, the adjacent wall portions of said flutes 18 and 19, and the adjacent wall portions of said flutes 18' and 19', are spaced equidistantly from a transverse vertical plane which extends through the center of the container and the center of handle protuberance 17. The spacing of the inner extremities of said inwardly extending flutes 18 and 19, and of 18' and 19', from a transverse vertical plane perpendicular thereto and through the center of the container is substantially equal.

It will be noted that the lower portion of each of said end wall flutes, for example 18 and 19, is formed integral with the end of the handle protuberance 17 to which it is adjacent. This integral structure of said inwardly extending flutes with the handle protuberance provides greatly increased lifting and bearing strength to the end wall. For example, lifting strength applied to said handle protuberance is distributed throughout said inwardly extending flutes 18 and 19 by virtue of said integral construction. Also, said handle protuberance 17 provides a bracing action to said inwardly extending flutes 18 and 19 when a vertical load is imparted thereto as when the containers are stacked. It will also be noted that each of the flutes 18 and 19 in end wall 12 is wider horizontally than each of the flutes 18' and 19' in end wall 12'.

A pair of substantially vertical and outwardly extending end wall flutes 20 and 21 are disposed in said end wall 12. A like pair of outwardly extending end wall flutes 20' and 21' are disposed in end wall 12'. One of said outwardly extending flutes, e.g., 20, is disposed adjacent one of the flutes, e.g., 18, of said first pair of inwardly extending end wall flutes on the side thereof which is nonadjacent said handle protuberance 17. The other of said outwardly extending flutes, e.g., 21, is disposed adjacent the other flute, e.g., 19, of said first pair of inwardly extending end wall flutes on the side thereof which is nonadjacent said handle protuberance 17. An essentially like structure is provided in said other end wall 12'.

A second pair of substantially vertical and inwardly extending end wall flutes, 22 and 23, and 22' and 23', are disposed in each of said end walls 12 and 12', respectively, with one, e.g., 22, being disposed adjacent one of said outwardly extending end wall flutes, e.g., 20, and the other, e.g., 23, being disposed adjacent the other of said outwardly extending end wall flutes, e.g., 21.

An opening 24 is provided in said bottom wall 13 within the confines of or adjacent each of said outwardly extending end wall flutes 20 and 21. An opening 24' is provided in said bottom wall 13 adjacent or within the confines of each of said outwardly extending end wall flutes 20' and 21'. A shelf means bridges the upper ends of each of said inwardly extending end wall flutes in end walls 12 and 12' and forms an interrupted ledge 26 extending horizontally across the top of said end wall 12 and another interrupted ledge 26' extending horizontally across the top of said end wall 12'. An upwardly extending boss member 27 is disposed on each portion of said ledge 26 which bridges one of said inwardly extending end wall flutes 18 and 19 which are disposed in said end wall 12. Each of said boss members 27 is opposite one of said bottom wall openings 24' disposed within the confines of outwardly extending end wall flutes 20' and 21' disposed in said other end wall 12'. Similarly, an upwardly extending boss member 27' is disposed on each portion of said ledge 26' which bridges one of said inwardly extending end wall flutes 22' and 23' disposed in said other end wall 12', with each of said boss members 27' being opposite one of said bottom wall openings 24 disposed within the confines of said outwardly extending end wall flutes 20 and 21 which are disposed in said end wall 12. Said boss members 27 and 27' are shaped to fit into said openings 24' and 24, respectively. In this connection, it will be noted that the medial spacing of a said boss member 27 and its cooperating opening 24', and the medial spacing of a said boss member 27' and its cooperating opening 24, from a vertical transverse plane through the center of the container are substantially equal. Thus, turning of an overlying container 180° with respect to an underlying container will bring said boss members 27 and 27' into engagement with said openings 24' and 24, respectively, and prevent longitudinal or lateral movement of the stacked containers.

A shelf means bridges the upper ends of each of said inwardly extending side wall flutes in side walls 11 and 11' and forms an interrupted ledge 30 which extends horizontally across the top of said side wall 11 and another interrupted ledge 30' which extends horizontally across the top of said side wall 11'. Said ledges 26', 30', 26, and 30, together form an interrupted ledge which extends around the top of the container. An opening 28 is provided in said bottom wall 13 within the confines of or adjacent each one of said outwardly extending side wall flutes 14. An opening 22' is provided in said bottom wall 13 adjacent or within the confines of each of said outwardly extending side wall flutes 14'. Upwardly extending boss members 29 and 29' are disposed on each portion of said ledges 30 and 30', respectively, which bridge one of said inwardly extending side wall flutes 16 and 16', respectively, with each of said boss members 29 being opposite one of said bottom wall openings 28' and each of said boss members 29' being opposite one of said bottom wall openings 28. The medial spacing of a said boss member 29 and cooperating opening 28', and the medial spacing of a said boss member 29' and cooperating opening 28 from a vertical transverse plane through the center of the container are substantially equal. Thus, when an overlying container is turned 180° with respect to an underlying container, said boss members 29 and 29' are brought into engagement with said openings 28' and 28, respectively.

A vertically extending bumper panel 31 is attached to the outer edges of said interrupted ledges and to the outer extremity of each of said outwardly extending flutes in said side and end walls, and preferably extends continuously around the top portion of the container. In a presently preferred embodiment of the invention, said bumper panel is attached at an intermediate point thereof to the outer edges of said ledges and said outwardly extending flutes as shown in the drawings so that a portion of said bumper panel extends above the horizontal surface of said ledges. However, it is within the scope of the invention for said bumper panel to be attached at its upper edge to said ledges and said outwardly extending flutes. It will be noted that as said bumper panel extends around the top of the container the corners of said bumper panel are rounded. This provides an advantage from a safety standpoint and in the handling of said containers by eliminating square corners. In a preferred embodiment of the invention, the rounded corners of said bumper panel are each provided with a plurality of vertically extending alternate grooves and ridges or corrugations 32. Said corrugations provide further advantages in strengthening said corners, and in the handling of said containers as when said containers come together at the corners said corrugations will tend to mesh. This feature is particularly advantageous in the operation of certain forms of machinery employed in the dumping of said containers, in which operation corners of adjacent containers are pivoted against each other.

As shown in the drawings, said inwardly extending and said outwardly extending flutes provided in the end walls and side walls are preferably flattened across their inner and outer extremities. Such a structure contains substantially all of the added strength afforded by rounded flutes or corrugations but has the advantage of increasing the volume of the container and providing a more nearly flat outer surface on the container. It will be understood that said inwardly extending and outwardly extending flutes can be of any desired shape. For example, said flutes can be rounded, rectangular, triangular, or any other suitable shape and/or when alternately adjacent to each other as in the side walls can be convolutions of sinusoidal form.

Figure 4:
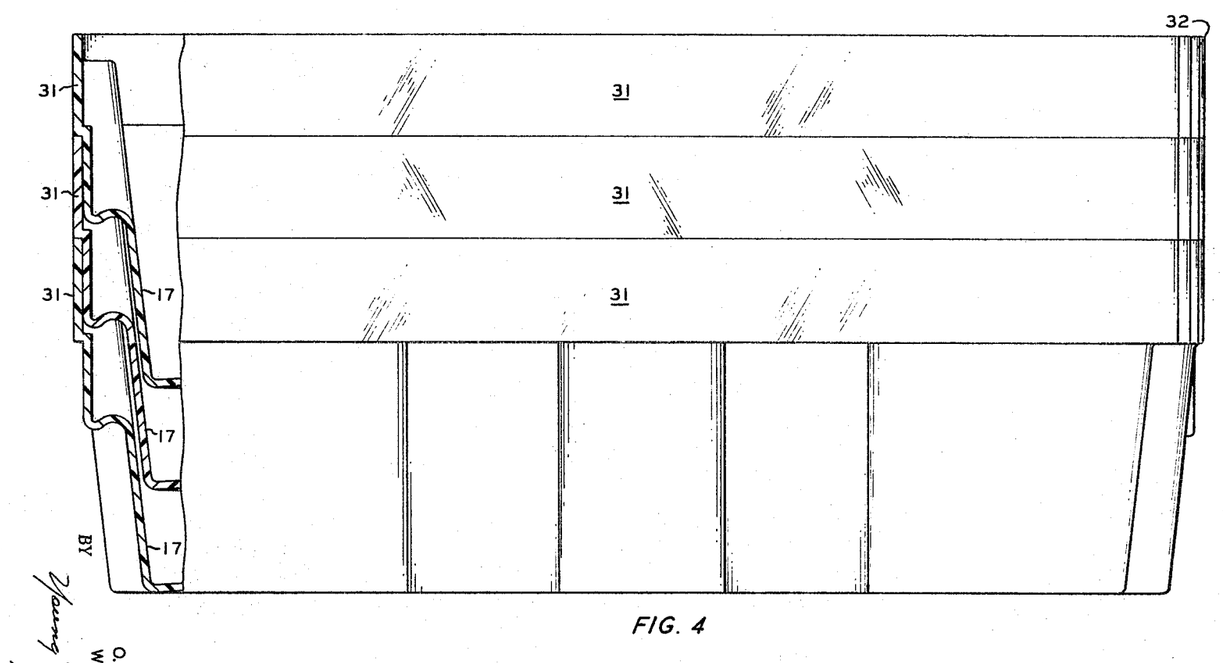
FIGURE 4 is a side view, partly in cross-section, showing three containers, generally like the container of FIGURE 1, in nesting arrangement.

FIGURE 4 illustrates three containers of the invention generally like the container of FIGURE 1, except that the perforations in the side walls and bottom have been omitted, in nesting arrangement. It will be noted that the bottom edge of bumper panel forms a nesting abutment which prevents said containers from wedging when nested.

As will be evident to those skilled in the art, the invention can be embodied in containers of widely varying size depending upon the service for which the container is intended. The various container embodiments of the invention are particularly adapted to be of such size as can be handled manually. For example, in one presently preferred embodiment the container is about 22 inches long, about 15 inches wide, and has a depth of about 8 to 10 inches, with the other elements thereof being in suitable proportion. These dimensions are given by way of example only and are not limiting on the invention in any manner. It is clearly within the scope of the invention to provide containers of any size, including large size containers which are handled primarily by machine, and small size containers smaller than those described above.

While the invention has been described above with reference to a generally rectangular container, it is within the scope of the invention to provide said containers in other shapes. For example, the containers can be octagonal with one pair of opposed walls like wall 12 and 12' in FIGURE 2 and another pair of opposed walls like 11 and 11' of said FIGURE 2. In such containers the above-described spacing for cooperating elements of opposed walls would apply. Also, while said invention has been described with particular reference to generally rectangular containers wherein one pair of walls, e.g., the side walls, are longer than the other pair of walls, e.g., the end walls, said containers can be generally square. Thus, herein and in the claims, unless otherwise specified, the terms "side wall" and "end wall" should be construed broadly.

It will be clear to those skilled in the art in view of this disclosure that the container illustrated in FIGURES 1 to 4 could be made generally square by merely shortening side walls 11 and 11' until they are of the same length as end walls 12 and 12'. However, such a container will stack only upon turning an overlying container 180° with respect to an underlying container.

Figure 5:
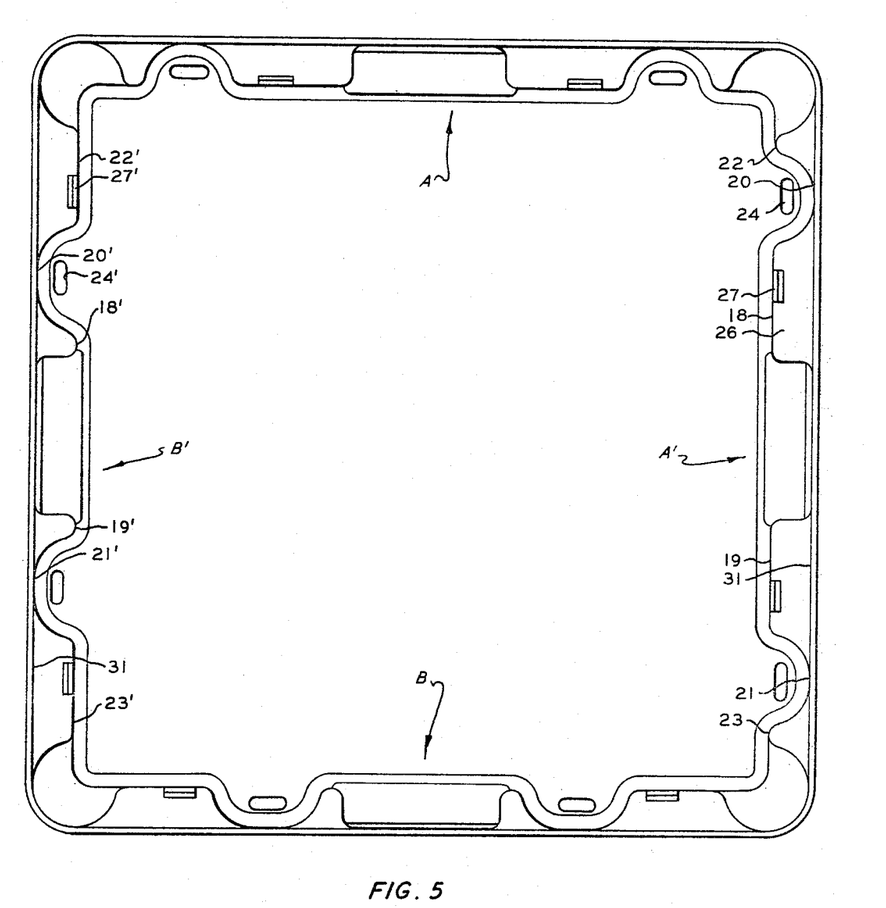
FIGURE 5 is a top or plan view of another container of the invention.

There are instances where it is desirable to have a nesting and stacking container which will stack on a like lower container when turned 90° with respect to said lower container. FIGURE 5 is a plan or top view of such a container. In view of the above detailed description of the container of FIGURES 1 to 4, it is not believed necessary to describe the container of FIGURE 5 in detail. Comparison of FIGURE 5 with FIGURE 2 will show that walls A and A' of FIGURE 5 are alike and each has essentially the same structure as wall 12 in FIGURE 2; and that walls B and B' of FIGURE 5 are alike and each has essentially the same structure as wall 12' in FIGURE 2. The spacings of cooperating elements of the opposed walls of the container of FIGURE 5 are like the spacings of cooperating elements of the opposed walls of the container of FIGURE 2. It will also be noted that the handle protuberances in opposed walls are opposite each other.

The following tabulation illustrates the nesting and stacking of identical overlying and underlying containers having the structure shown in FIGURE 5.

Position 1:
    Wall A over Wall A ⎫
    Wall B' over Wall B' ⎪ The containers
    Wall B over Wall B ⎪ will nest.
    Wall A' over Wall A' ⎭

Position 2 (Rotated 90° from Position 1):
    Wall A over Wall B' ⎫
    Wall B' over Wall B ⎪ The containers
    Wall B over Wall A' ⎪ will stack.
    Wall A' over Wall A ⎭

Position 3 (Rotated 90° from Position 2):
    Wall A over Wall B ⎫
    Wall B' over Wall A' ⎪ The containers
    Wall B over Wall A ⎪ will stack.
    Wall A' over Wall B' ⎭

Position 4 (Rotated 90° from Position3):
    Wall A over Wall A' ⎫
    Wall B' over Wall A ⎪ The containers
    Wall B over Wall B' ⎪ will stack.
    Wall A' over Wall B ⎭

From the above it is clear there are three positions in which identical containers having the structure illustrated in FIGURE 5 will stack. The container of FIGURE 5 has the further advantage of having a handle in each of the four walls.

The containers of the invention can be readily fabricated from any suitable moldable material including the various plastics, metals, etc., employing conventional techniques such as injection molding. High density polyethylenes are especially desirable materials from which to fabricate the containers of the invention. To high density polyethylene prepared by the methods disclosed and claimed by J. P. Hogan et al. in U.S. Patent 2,825,721, issued March 4, 1958, are one group of presently preferred moldable materials.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A container adapted to be nested and stacked vertically with a container of identical shape, comprising: a pair of opposed first walls sloping inwardly toward each other from top to bottom; a pair of opposed transverse second walls sloping inwardly toward each other from top to bottom; a bottom wall connected to the lower edges of said first walls and said second walls to provide an open top structure; an inwardly and horizontally extending handle protuberance disposed in each wall of at least one said pair of opposed walls and opposite each other, each said protuberance terminating in an upper outwardly extending surface at a level intermediate the top and bottom of the wall in which it is disposed; and a pair of horizontally spaced apart substantially vertical and inwardly extending flutes disposed in each of said walls having a handle protuberance disposed therein, with one flute at each opposite end of said handle protuberance therein, the lower portion of each said flute being formed integral with the adjacent end of said handle protuberance therein, and each flute of one of said pair of flutes being wider horizontally than each flute of the other said pair of flutes.

2. A container adapted to be nested and stacked vertically with a container of identical shape, comprising: a pair of opposed first walls sloping inwardly toward each other from top to bottom; a pair of opposed transverse second walls sloping inwardly toward each other from top to bottom; a bottom wall connected to the lower edges of said first walls and said second walls to provide an open top structure; an inwardly and horizontally extending handle protuberance disposed in each of said second walls and opposite each other, each said protuberance terminating in an upper outwardly extending surface at a level intermediate the top and bottom of the wall in which it is disposed; and a pair of horizontally spaced apart substantially vertical and inwardly extending flutes disposed in each of said second walls with one flute at each opposite end of the handle protuberance therein, the lower portion of each said flute being formed integral with the adjacent end of said handle protuberance, and each flute of said pair of flutes in one of said second walls being wider horizontally than each flute in said pair of flutes in the other said second wall.

3. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; an inwardly and horizontally extending handle protuberance centrally disposed in each of said end walls, each said protuberance terminating in an upper outwardly extending surface at a level intermediate the top and bottom of the end wall in which it is disposed; and a pair of horizontally spaced apart substantially vertical and inwardly extending flutes disposed in each of said end walls with one flute at each opposite end of the handle protuberance therein, the lower portion of each said flute being formed integral with the adjacent end of said handle protuberance, and each flute of said pair of flutes in one of said end walls being wider horizontally than each flute in said pair of flutes in the other said end wall.

4. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; an inwardly and horizontally extending handle protuberance centrally disposed in each of said end walls, each said protuberance terminating in an upper outwardly extending surface at a level intermediate the top and bottom of the end wall in which it is disposed; a pair of horizontally spaced apart substantially vertical and inwardly extending flutes disposed in each of said end walls with one flute at each opposite end of the handle protuberance therein, the lower portion of each said flute being formed integral with the adjacent end of said handle protuberance, and each flute of said pair of flutes in one of said end walls being wider horizontally than each flute of said pair of flutes in the other said end wall; shelf means bridging the upper ends of each of said flutes and forming an interrupted ledge extending horizontally across the top of each of said end walls; and a vertically extending bumper panel attached to the outer edge of said ledge.

5. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; an inwardly and horizontally extending handle protuberance centrally disposed in each of said end walls, each said protuberance terminating in an upper outwardly extending surface at a level intermediate the top and bottom of the end wall in which it is disposed; a first pair of horizontally spaced apart substantially vertical and inwardly extending flutes disposed in each of said end walls with one flute at each opposite end of the handle protuberance therein, the lower portion of each said flute being formed integral with the adjacent end of said handle protuberance, each flute of said pair of flutes in one of said end walls being wider horizontally than each flute of the said pair of flutes in the other said end wall; a pair of substantially vertical and outwardly extending flutes disposed in each of said end walls, one being disposed adjacent one of said inwardly extending flutes on the side thereof which is nonadjacent said handle protuberance and the other being disposed adjacent the other of said inwardly extending flutes on the side thereof which is nonadjacent said handle protuberance; a second pair of substantially vertical and inwardly extending flutes disposed in each of said end walls, one being disposed adjacent one of said outwardly extending flutes and the other being disposed adjacent the other of said outwardly extending flutes; an opening provided in said bottom wall within the confines of each of said outwardly extending flutes; shelf means bridging the upper ends of each of said inwardly extending flutes and forming an interrupted ledge extending horizontally across the top of each of said end walls; an upwardly extending boss member disposed on each portion of said ledge which bridges one of said first pair of inwardly extending flutes disposed in said one end wall, each of said boss members being opposite one of said bottom wall openings within the confines of said outwardly extending flutes disposed in said other end wall; an upwardly extending boss member disposed on each portion of said ledge which bridges one of said second pair of inwardly extending flutes disposed in said other end wall, each of said boss members being opposite one of said bottom wall openings within the confines of said outwardly extending flutes disposed in said one end wall; and a vertically extending bumper panel attached at an intermediate point thereof to the outer edge of said ledge and the outer extremity of each of said outwardly extending flutes.

6. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; a plurality of vertical alternate outwardly extending and inwardly extending side wall flutes disposed in each of said side walls and being so arranged that an inwardly extending flute in one side wall is opposite an outwardly extending flute in the other side wall; an inwardly and horizontally extending handle protuberance centrally disposed in each of said end walls, each said protuberance terminating in an upper outwardly extending surface at a level intermediate the top and bottom of the end wall in which it is disposed; and a pair of horizontally spaced apart substantially vertical and inwardly extending end wall flutes disposed in each of said end walls with one flute at each opposite end of the handle protuberance therein, the lower portion of each said end wall flute being formed integral with the adjacent end of said handle protuberance, and each flute of said pair of end wall flutes in one of said end walls being wider horizontally than each flute of the said pair of end wall flutes in the other said end wall.

7. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; a plurality of substantially vertical alternate outwardly extending and inwardly extending side wall flutes disposed in each of said side walls and being so arranged that an inwardly extending flute in one side wall is opposite an outwardly extending flute in the other side wall; an inwardly and horizontally extending handle protuberance centrally disposed in each of said end walls, each said protuberance terminating in an upper outwardly extending surface at a level intermediate the top and bottom of the end wall in which it is disposed; a first pair of horizontally spaced apart substantially vertical and inwardly extending end wall flutes disposed in each of said end walls with one flute at each opposite end of the handle protuberance therein, the lower portion of each said end wall flute being formed integral with the adjacent end of said handle protuberance, each flute of said pair of end wall flutes in one of said end walls being wider horizontally than each flute of the said pair of end wall flutes in the other said end wall; a pair of substantially vertical and outwardly extending end wall flutes disposed in each of said end walls, being disposed adjacent one flute of said first pair of inwardly extending end wall flutes on the side thereof which is nonadjacent said handle protuberance and the other being disposed adjacent the other flute of said first pair of inwardly extending end wall flutes on the side thereof which is nonadjacent said handle protuberance; a second pair of vertically and inwardly extending end wall flutes disposed in each of said end walls, one being disposed adjacent one of said outwardly extending end wall flutes and the other being disposed adjacent the other of said outwardly extending end wall flutes; shelf means bridging the upper ends of each of said inwardly extending flutes and forming an interrupted ledge extending horizontally around the top of said side and end walls; and a vertically extending bumper panel attached at an intermediate point thereof to the outer edge of said ledge and the outer extremity of each of said outwardly extending flutes and extending continuously around the top portion of said container.

8. A container adapted to be nested and stacked vertically with a container of identical shape, comprising: a pair of opposed side walls sloping inwardly toward each other from top to bottom; a pair of opposed transverse end walls sloping inwardly toward each other from top to bottom and connected to said side walls along the vertical edges thereof; a bottom wall connecting the lower edges of said side walls and said end walls to provide a generally rectangular open top structure; a plurality of substantially vertical alternate outwardly extending and inwardly extending side wall flutes disposed in each of said side walls and being so arranged that an inwardly extending flute in one side wall is opposite an outwardly extending flute in the other side wall; an inwardly and horizontally extending handle protuberance centrally disposed in each of said end walls, each said protuberance terminating in an upper outwardly extending arcuate surface at a level intermediate the top and bottom of the end wall in which it is disposed; a first pair of horizontally spaced apart substantially vertical and inwardly extending end wall flutes disposed in each of said end walls with one flute at each opposite end of the handle protuberance therein, the lower portion of each said end wall flute being formed integral with the adjacent end of said handle protuberance, each flute of said pair of end wall flutes in one of said end walls being wider horizontally than each flute of the said pair of end wall flutes in the other said end wall; a pair of substantially vertical and outwardly extending end wall flutes disposed in each of said end walls, one being disposed adjacent one flute of said first pair of inwardly extending end wall flutes on the side thereof which is nonadjacent said handle protuberance and the other being disposed adjacent the other flute of said first pair of inwardly extending end wall flutes on the side thereof which is nonadjacent said handle protuberance; a second pair of vertically and inwardly extending end wall flutes disposed in each of said end walls, one being disposed adjacent one of said outwardly extending end wall flutes and the other being disposed adjacent the other of said outwardly extending end wall flutes; an opening provided in said bottom wall within the confines of each of said outwardly extending end wall flutes; shelf means bridging the upper ends of each of said inwardly extending flutes and forming an interrupted ledge extending horizontally around the top of said side and end walls; an upwardly extending boss member disposed on each portion of said ledge which bridges one of said first pair of inwardly extending end wall flutes disposed in said one end wall, each of said boss members being opposite one of said bottom wall openings within the confines of said outwardly extending end wall flutes disposed in said other end wall; an upwardly extending boss member disposed on each portion of said ledge which bridges one of said second pair of inwardly extending end wall flutes disposed in said other end wall, each of said boss members being opposite one of said bottom wall openings within the confines of said outwardly extending end wall flutes disposed in said one end wall; an opening provided in said bottom wall within the confines of each one of said outwardly extending side wall flutes which is opposite an inwardly extending side wall flute; an upwardly extending boss member disposed on each portion of said ledge which bridges one of said inwardly extending side wall flutes, each of said boss members being opposite one of said bottom wall openings within the confines of said outwardly extending side wall flutes; a vertically extending bumper panel attached at an intermediate point thereof to the outer edge of said ledge and the outer extremity of each of said outwardly extending flutes and extending continuously around the top portion of said container; and a plurality of vertically extending corrugations provided in the rounded corners of said bumper panel.

9. A container according to claim 8 wherein each of said side walls and said bottom wall is provided with a plurality of perforations.

10. A container adapted to be nested and stacked vertically with a container of identical shape, comprising: a pair of opposed first walls sloping inwardly toward each other from top to bottom; a pair of opposed transverse second walls sloping inwardly toward each other from top to bottom and connected to said first walls along the vertical walls thereof; a bottom wall connected to the lower edges of said first walls and said second walls to provide a generally square open top structure; an inwardly and horizontally extending handle protuberance disposed in each of said walls and opposite each other, each said protuberance terminating in an upper outwardly extending surface at a level intermediate the top and bottom of the wall in which it is disposed; and a pair of horizontally spaced apart substantially vertical and inwardly extending flutes disposed in each of said walls with one flute at each opposite end of the handle protuberance therein, the lower portion of each said flute being formed integral with the adjacent end of said handle protuberance, each flute of said pair of flutes in one of said first walls being wider horizontally than each flute in said pair of flutes in the other said first wall, and each flute of said pair of flutes in one of said second walls being wider horizontally than each flute in said pair of flutes in the other said second wall.

11. A container adapted to be nested and stacked vertically with a container of identical shape, comprising: a pair of opposed first walls sloping inwardly toward each other from top to bottom; a pair of opposed transverse second walls sloping inwardly toward each other from top to bottom and connected to said first walls along the vertical edges thereof; a bottom wall connecting the lower edges of said first walls and said second walls to provide a generally square open top structure; an inwardly and horizontally extending handle protuberance centrally disposed in each of said walls, each said protuberance terminating in an upper outwardly extending surface at a level intermediate the top and bottom of the wall in which it is disposed; a pair of horizontally spaced apart substantially vertical and inwardly extending flutes disposed in each of said walls with one flute at each opposite end of the handle protuberance therein, the lower portion of each said flute being formed integral with the adjacent end of said handle protuberance, each flute of said pair of flutes in one of said first walls being wider horizontally than each flute of said pair of flutes in the other said first wall, and each flute of said pair of flutes in one of said second walls being wider horizontally than each flute in said pair of flutes in the other said second wall; shelf means bridging the upper ends of each of said flutes and forming an interrupted ledge extending horizontally across the top of each of said walls; and a vertically extendinng bumper panel attached to the outer edges of said ledge.

12. A container adapted to be nested and stacked vertically with a container of identical shape, comprising: a pair of opposed first walls sloping inwardly toward each other from top to bottom; a pair of opposed transverse second walls sloping inwardly toward each other from top to bottom and connected to said first walls along the vertical edges thereof; a bottom wall connecting the lower edges of said first walls and said second walls to provide a generally square open top structure; an inwardly and horizontally extending handle protuberance centrally disposed in each of said walls, each said protuberance terminating in an upper outwardly extending surface at a level intermediate the top and bottom of the wall in which it is disposed; a first pair of horizontally spaced apart substantially vertical and inwardly extending flutes disposed in each of said walls with one flute at each opposite end of the handle protuberance therein, the lower portion of each said flute being formed integral with the adjacent end of said handle protuberance, each flute of said pair of flutes in one of said first walls being wider horizontally than each flute of the said pair of flutes in the other said first wall, and each flute in said pair of flutes in one of said second walls being wider horizontally than each flute in said pair of flutes in the other said second wall; a pair of substantially vertical and outwardly extending flutes disposed in each of said walls, one being disposed adjacent one of said inwardly extending flutes on the side thereof which is nonadjacent said handle protuberance and the other being disposed adjacent the other of said inwardly extending flutes on the side thereof which is nonadjacent said handle protuberance; a second pair of substantially vertical and inwardly extending flutes disposed in each of said walls, one being disposed adjacent one of said outwardly extending flutes and the other being disposed adjacent the other of said outwardly extending flutes; an opening provided in said bottom wall within the confines of each of said outwardly extending flutes; shelf means bridging the upper ends of each of said inwardly extending flutes and forming an interrupted ledge extending horizontally across the top of each of said walls; an upwardly extending boss member disposed on each portion of said ledge which bridges one of said first pair of inwardly extending flutes disposed in said first walls, each of said boss members being opposite one of said bottom wall openings within the confines of said outwardly extending flutes disposed in said second walls; an upwardly extending boss member disposed on each portion of said ledge which bridges one of said first pair of inwardly extending flutes disposed in said second walls, each of said boss members being opposite one of said bottom wall openings within the confines of said outwardly extending flutes disposed in said first walls; and a vertically extending bumper panel attached at an intermediate point thereof to the outer edge of said ledge and the outer extremity of each of said outwardly extending flutes.

References Cited by the Examiner

UNITED STATES PATENTS

| | | | |
|---|---|---|---|
| D. 197,311 | 1/1964 | Spaak | 220—29 X |
| 2,813,656 | 11/1957 | Anderson | 220—97 |
| 3,147,882 | 9/1964 | Waters | 220—97 |

FOREIGN PATENTS 225,603  1/1963  Austria.

THERON E. CONDON, *Primary Examiner.*

G. E. LOWRANCE, *Assistant Examiner.*